United States Patent [19]

Asaka et al.

[11] Patent Number: 4,772,843

[45] Date of Patent: Sep. 20, 1988

[54] TIME MEASURING APPARATUS

[75] Inventors: Takao Asaka; Yuji Yamaguchi; Hideto Iwaoka, all of Tokyo, Japan

[73] Assignee: Yokogawa Electric Corporation, Tokyo, Japan

[21] Appl. No.: 56,140

[22] Filed: May 29, 1987

[30] Foreign Application Priority Data

| | | | |
|---|---|---|---|
| Jun. 6, 1986 | [JP] | Japan | 61-131455 |
| Jun. 20, 1986 | [JP] | Japan | 61-144196 |
| Jun. 24, 1986 | [JP] | Japan | 61-147570 |
| Jul. 10, 1986 | [JP] | Japan | 61-162834 |

[51] Int. Cl.$^4$ .............................................. H02J 15/00

[52] U.S. Cl. ..................................... 320/1; 328/129.1; 368/120

[58] Field of Search .............. 320/1; 328/129.1, 130.1; 364/569; 368/113, 118, 120; 377/20

[56] References Cited

U.S. PATENT DOCUMENTS

| | | | |
|---|---|---|---|
| 4,002,979 | 1/1977 | Giori et al. | 368/113 |
| 4,090,141 | 5/1978 | Leblanc | 328/129.1 |
| 4,362,394 | 12/1982 | Menlove | 368/118 |
| 4,613,950 | 9/1986 | Knierim et al. | 377/20 |
| 4,637,733 | 1/1987 | Charles et al. | 364/569 |

*Primary Examiner*—Patrick R. Salce
*Assistant Examiner*—Jeffrey Sterrett
*Attorney, Agent, or Firm*—Moonray Kojima

[57] ABSTRACT

In order to accurately measure time interval Tx from time $t_j$ to time $t_k$, the pulse widths of a start interpolation pulse and a stop interpolation pulse must be measured accurately. The invention uses two time-to-voltage converters, one for the start interpolation pulse and the other for the stop interpolation pulse, to convert these pulses to corresponding voltage signals to thereby measure the pulse widths. These converters each comprises a high speed circuit which comprises a current switch, a capacitor, a constant current source and a diode. Advantageously, even though the start and stop interpolation pulses occur close to each other, the pulses can be measured accurately. Also, even though the pulses occur at short intervals, the time interval Tx can be measured accurately.

2 Claims, 14 Drawing Sheets

TIME MEASURING APPARATUS

BACKGROUND OF THE INVENTION

1. Field of Invention

This invention relates to a time measuring apparatus which is capable of measuring time interval Tx with higher resolution than the period $t_o$ of a clock signal by measuring start and stop interpolation times. More particularly, this invention relates to a time measuring apparatus which is capable of accurately measuring a very short time interval.

2. Description of the Prior Art

Generally, in order to measure a time interval accurately, the following principle is used. A clock signal having a period $t_o$ is passed to a gate which is opened for a time interval Tx to be measured and the number of clock pulses N which have passed the gate is counted to thereby determine $Nt_o$ as the time interval.

Strictly speaking, according to this method, it does not hold that $Tx=Nt_o$ but that $Tx\approx Nt_o$. This is because usually Tx cannot be divided by $t_o$ with a remainder of a small interpolation time. This is shown in FIG. 4, line (c), wherein $\Delta T_1$ denotes the start interpolation time interval from the rising edge of Tx to a clock pulse $C_o$ occurring immediately after the rising edge $\Delta T_2$ (shown at line (d)) denotes a stop interpolation time interval from the falling edge of Tx to a clock pulse $C_n$ occurring immediately thereafter. The gate is opened for the time interval from clock pulse $C_o$ to $C_n$ (see FIG. 4, line (e)) to count clock pulses which pass therethrough. If the number of clock pulses inputted for the time interval is N (see FIG. 4 line (f)), the time interval Tx to be measured is represented by Equation (1)

$$Tx=Nt_o 30\ \Delta T_1-\Delta T_2 \quad (1)$$

Therefore, it can be understood from Equation (1) that if the interpolation time intervals $\Delta T_1$ and $\Delta T_2$ are measured, the time interval Tx can be measured with a higher resolution than the clock period $t_o$.

One apparatus for measuring the interpolation time ΔT uses the so-called "time expansion" system which will be described with reference to FIG. 20. In this sytem, for example, a capacitor is charged with a current value of 200·I for duration of a pulse width ΔT of an interpolation pulse (FIG. 20, line (b)). Thus, the voltage $V_p$ across the capacitor is proportion to ΔT. Thereafter, the capacitor is discharged slowly with a current value, for example, of I. The time $(t_3-t_2)$ required for discharging the capacitor is proportional to the pulse width ΔT. Thus, an expanded pulse width signal (FIG. 20, line (d)) corresponding to the time interval from the falling edge (time $t_1$) of the interpolation pulse (FIG. 20, line (b)) to the completion of the discharge (time $t_3$) is obtained. This expanded pulse width signal $T_D$ is counted using a clock pulse signal (FIG. 20, line (a)) to accurately measure ΔT, namely, the interpolation pulse. Of course, the expanded pulse width signal of FIG. 20, line (d) may be replaced witn a pulse width signal of time interval $(t_3-t_2)$.

The above time expansion system expands a small pulse width ΔT and counts the expanded pulse width $T_D$ with a clock pulse signal in order to measure the pulse width ΔT accurately without measuring the interpolation time directly. This system requires the expanded pulse width interval $T_D$, so that the response of the time interval measuring circuit is low. Thus, if the measured time interval Tx (see FIG. 4, line (a)) is inputted repeatedly, the next measurement cannot be performed unless the measurement of the start and stop interpolation pulses is completed. Hence, the frequency of the repeated input time intervals Tx is low. In other words, a short time interval measurement (or put another way, high speed repeated measurement) cannot be conducted.

SUMMARY OF THE INVENTION

An object of the invention is to provide a time measuring apparatus which is capable of accurately measuring the time interval Tx between two input signals although the time interval is short or the repetition frequency of the two signals is high.

Another object is to provide a time measuring apparatus which is capable of accurately measuring the time difference $T_1$ between two input signals in spite of the sequence in which the two signals are inputted.

This invention comprises a time-to-voltage converter wherein the pulse width of a start interpolation pulse is converted to a voltage and a time-to-voltage converter wherein the pulse width of a stop interpolation pulse is converted to a voltage. Each converter causes a current to flow from a constant current source to a capacitor during the interpolation pulse width interval. Thus, the value of the voltage across the capacitor corresponds to the pulse width of the interpolation pulse. This voltage is converted directly to a digital signal by a high speed A to D (analog to digital) converter. According to the invention, the time required for discharging the capacitor is optimal and the time required by conventional means is not required to read the capacitor voltage. Provision of the time-to-voltage converters for measuring the pulse widths of the start and stop interpolation pulses, respectively, allows the pulse width of the two pulses to be measured reliably even though the pulses are close to each other, that is, the time interval Tx is very short.

In addition, a counter is provided for counting pulses and a central processing unit is used to measure the time difference $T_1$ between the two signals in spite of the sequence of occurrence of the two signals.

DESCRIPTION OF PREFERRED EMBODIMENTS

Figure 1:
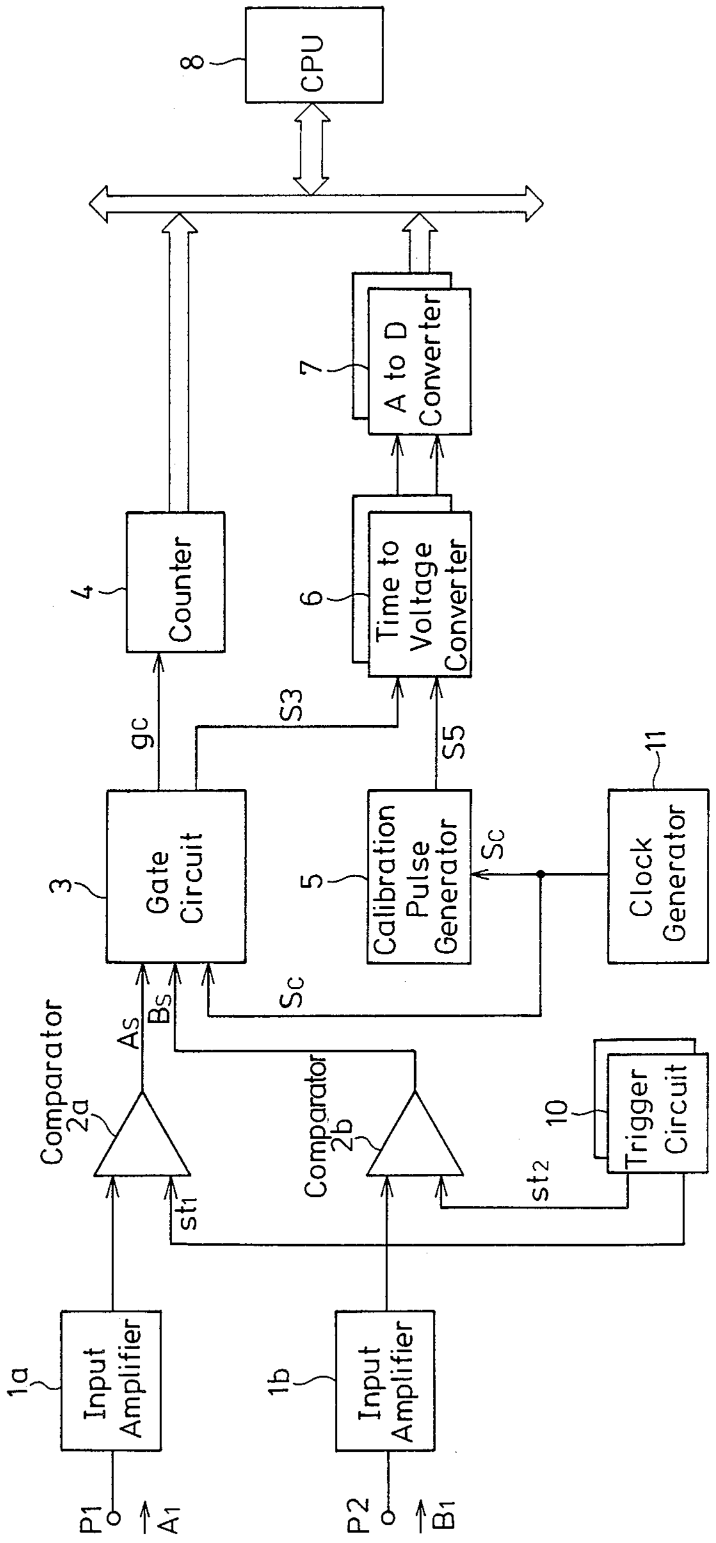
FIG. 1 is a block diagram depicting an illustrative embodiment of the invention.

The time measuring apparatus of the invention is depicted in FIG. 1 as comprising input terminals p1, p2 for receiving signals to be measured. Two signals A1, B1, the time difference between which is to be measured, are inputted to input terminals p1,p2, respectively. The invention is capable of accurately measuring the time difference between occurrences of two signals A1 and B1 inputted to input terminals p1, p2,even though the two signals may be of high frequency and the difference between the times at which the two signals occur may be small.

Input amplifiers 1a,1b operate as buffer amplifiers for the signals A1, B1 to be measured and function as an attenuator and/or selctor of a DC coupling/AC coupling.

Comparators 2a,2b compare trigger level signals st1, st2 introduced from a trigger circuit 10 with signals introduced from input amplifiers 1a,1b, respectively, to shape the measured signals A1,B1 to a step-like waveform. Such shaping of the measured signals facilitates signal processing at a gate circuit 3 and the subsequent circuits to be described below. The output of comparator 2a is used as a start signal As and the output of comparator 2b is used as a stop signal Bs. The apparatus of the invention measures the time interval from the rising edge of the start signal As to the rising edge of the stop signal Bs.

Gate circuit 3 receives signals As and Bs from comparators 2a, 2b and a clock signal sc from a clock generator 11. It produces a signal S3 having a pulse width corresponding to the start interpolation time interval $\Delta T_1$ and the stop interpolation time interval ΔT2 shown in FIG. 4, lines (c) and (d), and a gated clock signal gc of FIG. 4, line (f) and outputs them to the next stage.

Figure 17:
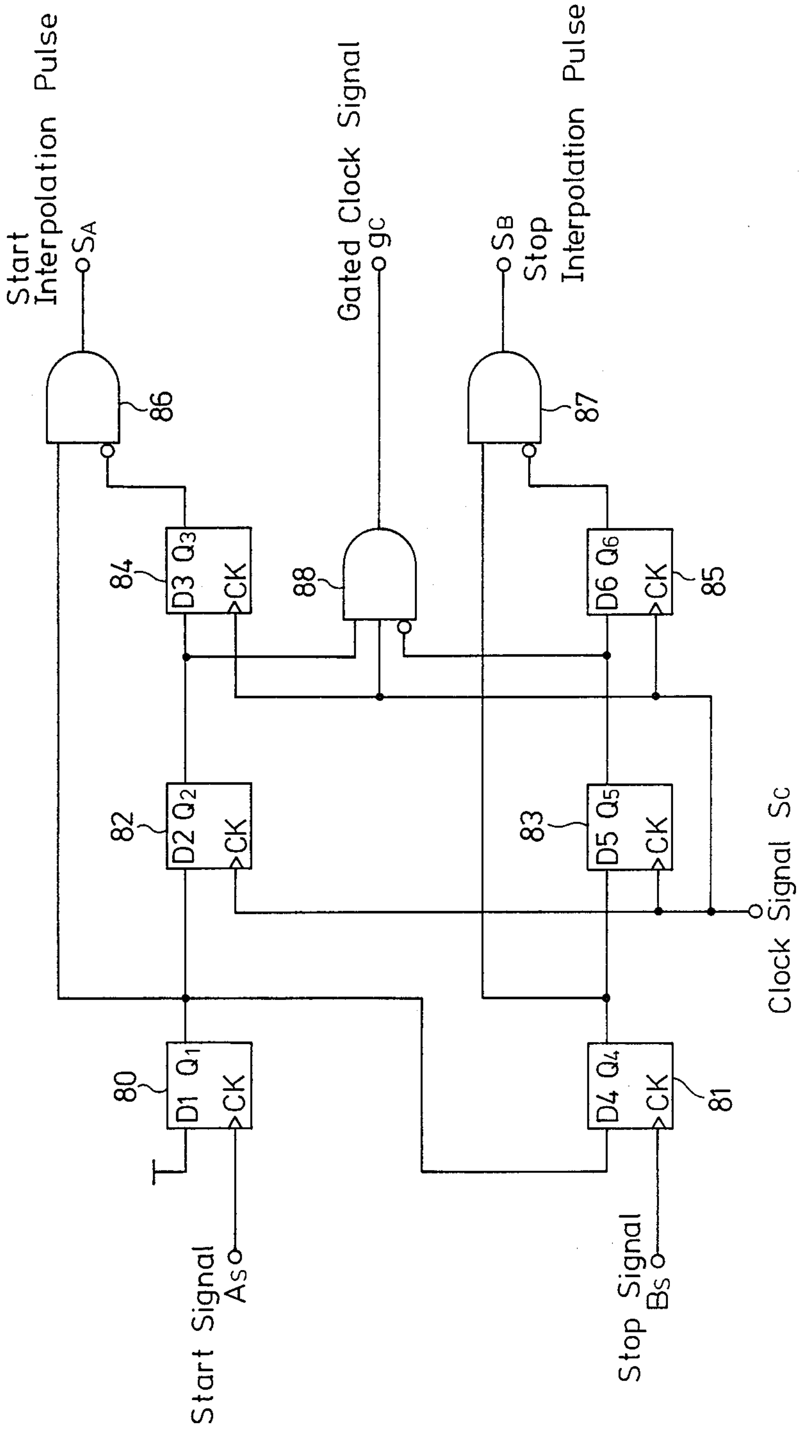
FIG. 17 depicts an illustrative gate circuit, such as used in FIG. 1.

Gate circuit 3 may be of a conventional type For example, FIG. 17 shows the structure of gate circuit 3 as comprising flip-flops 80-85 and gates 86-88. When each flip-flop receives a signal at its input terminal ck, it outputs the state of D input terminal (which may be high or low) to a Q terminal.

Figure 18:
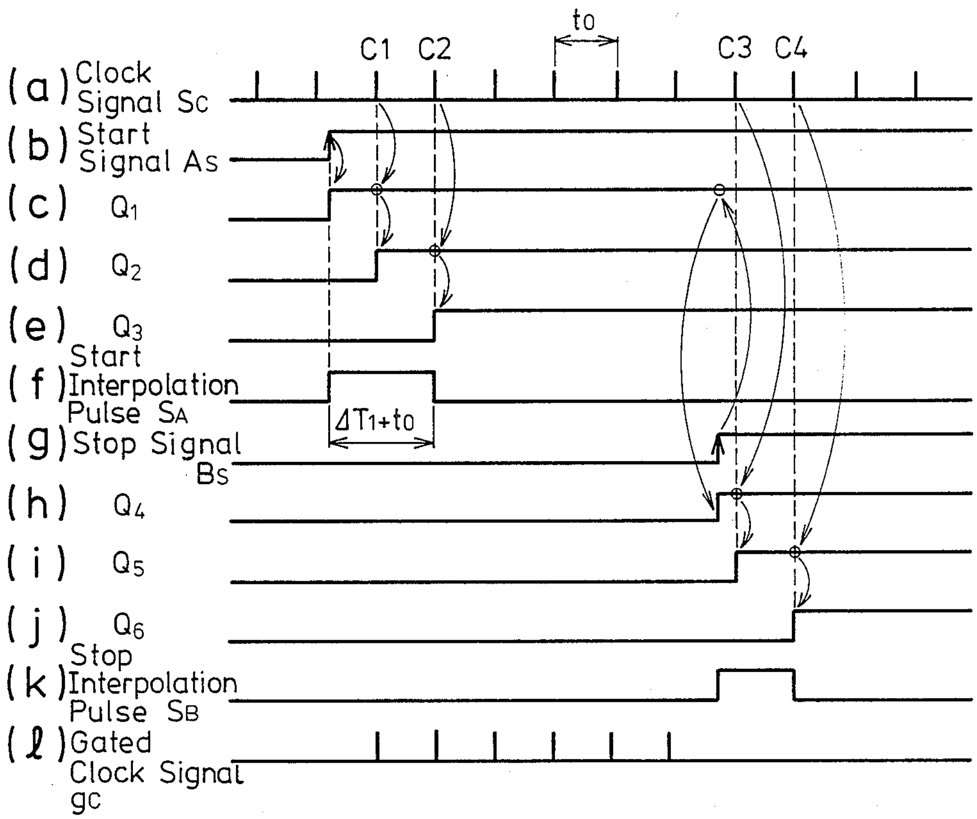
FIG. 18, comprising lines (a)-(l),is a timing chart for the circuit of FIG. 17.

FIG. 18, comprising lines (a)-(l), is a timing chart for the respective sections of FIG. 17. A clock signal sc is applied to flip-plots 82-85.

The start interpolation pulse SA is obtained from a circuit comprising flip-flops 80,82, 84 and gate 86, while the stop interpolation pulse SB is obtained from a circuit comprising flip-flops 81, 83,85 and a gate 87. A gated clock signal gc is obtained from a gate 88.

The operation of the apparatus for obtaining the start interpolation pulse SA will now be described. Not shown in FIG. 17, flip-flops 80-85 are initially reset(assuming that the Q terminal is low). When a start signal As, shown in FIG. 18, line (b), is applied from comparator 2a to flip-flop 80, Q1 becomes "high" synchronously with the rising edge of start signal As because the $D_1$ input is "high". Thus, the output SA of gate 86 becomes "high". Under such condition, when a clock signal c1, shown in FIG. 18, line (a), is applied to flip-flop 82, the Q2 output of flip-flop 82 becomes "high". In addition, when the next clock pulse c2 is applied, the $Q_3$ output of flip-flop 84 becomes "high", so that the output SA of gate 86 becomes "low". Thus, the start interpolation pulse SA, shown in FIG. 18, line (f), is outputted from gate 86.

The circuit comprising flip-flops 81,83,85 and gate 87 is the same as the circuit comprisng flip-flops 80,82,84 and gate 86, so that the stop interpolation pulse SB is obtained from gate 87 in the same manner as just described for the start interpolation pulse SA.

Referring to gate 88, the sign of a circle attached to the input terminal of gate 88 means inversion of the signal. Thus, when the Q2 output of flip-flop 82 is "high" and the Q5 output of flip-flop 83 is "low", the gate 88 is opened and outputs a clock signal sc applied thereto. The Q5 output of flip-flop 83 is maintained "low" until a clock pulse c3, shown in FIG. 18, line (a), is produced. When a clock pulse c1, shown in FIG. 18, line (a), is produced, the Q2 output of flip-flop 82 becomes "high", so that gate 88 is opened. When a clock pulse c3 is produced, the Q5 output of flip-flop 83 becomes "high" so that gate 88 is closed. Thus, as shown in FIG. 18, line (l), a gated clock signal gc is obtained from gate 88.

Figure 4:
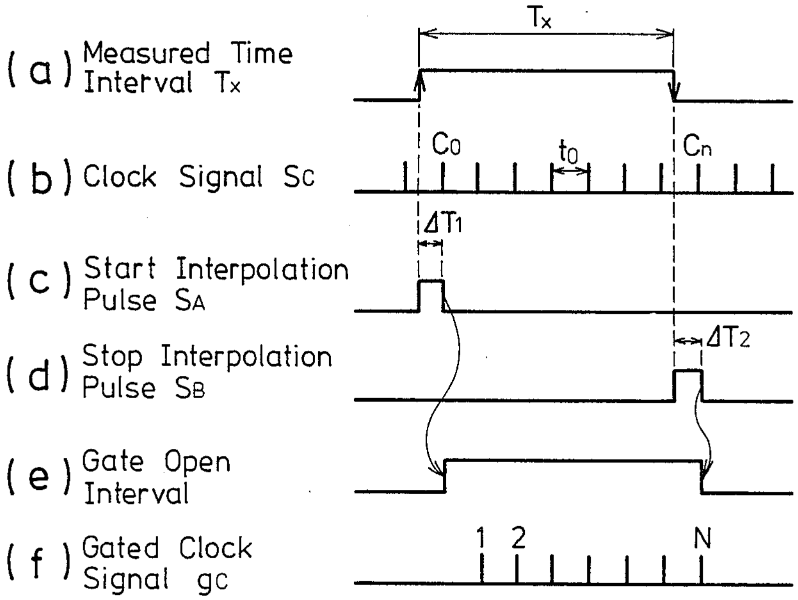
FIG. 4, comprising lines (a)–(f), is a timing chart depicting operation of the invention.

In order to facilitate the understanding of the invention, in FIG. 4, the start interpolation pulse SA (FIG. 4, line (c)) and the stop interpolation pulse SB (FIG. 4, line (d)) are described as the intervals from the rising and falling edges of the time intervals to be measured Tx (FIG. 4, line (a)) to clock pulses Co and Cn occurring immediately after the rising and falling edges, respectively. Since the magnitude of the widths ΔT1, ΔT2 of the interpolation pulses is between 0 and $t_o$, however, the pulse width of the interpolation pulses may have to be limitlessly close to 0 in some cases. However, it is very difficult to produce a pulse having $\Delta T1 \approx 0$. Thus, as shown in FIG. 18, line (f) and line (k), a conventional gate circuit 3 is constructed so as to produce a pulse having a width $tA=(\Delta T1+t_o)$ wherein tA, tB denote the pulse widths of the inter polation pulses, ΔT1 is the pulse described in FIG. 4, line (c), and $t_o$ is the period of a clock pulse signal sc. This prevents $tA \approx 0$ from holding.

Counter 4 counts gated clock pulses gc, as shown in FIG. 4, line (f). Calibration pulse generator 5 generates a signal whose pulse width is known accurately in advance, in order to eliminate the influence of a bias current when the interpolation time is measured. The pulse width $t_o$ of a clock signal sc is used as a known pulse width. The calibration pulse generator 5 may comprise a conventional circuit.

A time-to-voltage converter 6 outputs a signal whose voltage is changed depending on the pulse width of the interpolation pulse s3 (which generally denotes the start interpolation pulse SA and the stop interpolation pulse SB) introduced from gate circuit 3 and the signal s5 introduced from calibration pulse generator 5. One of the features of this invention is that two time-to-voltage converters are provided which are capable of measuring a time interval at high speeds and with high resolution, corresponding to the start and stop interpolation pulses SA and SB. FIGS. 5, 7, 11 and 12 whow specific illustrative time-to-voltage converters which may be used in the invention.

An A to D (analog to digital) convert 7 converts the output from time-to-voltage convert 6 to a digital signal. FIG. 1 shows a pair of A to D converters 7. However, the invention can operate with only one A to D converter 7. In the art to which this invention is related, the apparatus is required to perform high speed processing, so that usually a successive approximation converter or a flash type A to D converter is used for the A to D converter. At present, A to D converters having a conversion speed on the order of several microseconds to several nanoseconds are well known. The invention uses such well known high speed A to D converters.

The outputs from A to D converters 7 and counter 4 are inputted to CPU 8 (central processing unit) which performs an arithmetic operation such as, for example, Equation (1) to obtain the time interval Tx to be measured. It is to be noted that when CPU 8 calculates Tx it performs a correcting calculation to eliminate the influence of bias current, offset voltage, etc, using the measured value of a calculated pulse. The CPU 8 may, for example, comprise a microprocessor.

Figure 2:
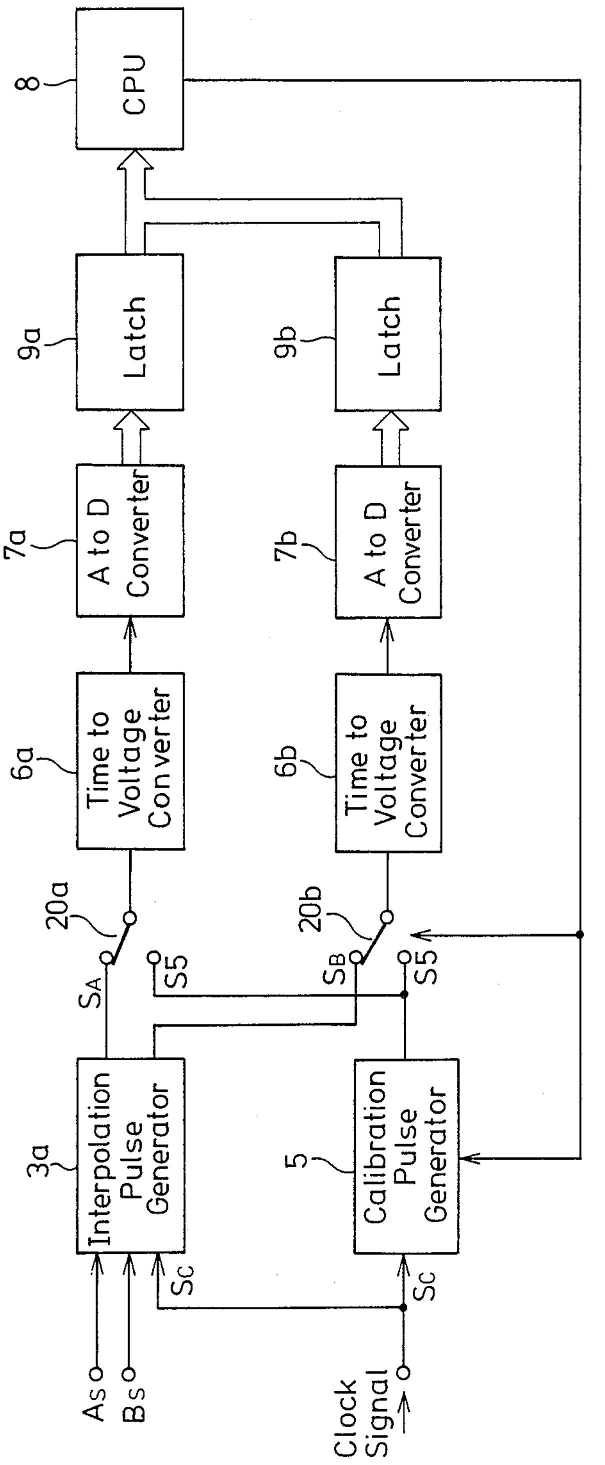
FIG. 2 is a block diagram depicting a section of the embodiment of FIG. 1.

FIG. 2 illustrates in detail a section of FIG. 1 which measures the interpolation time interval ΔT and the calibration pulse width $t_o$ and $2t_o$. FIG. 2 illustrates an interpolation pulse generator 3*a* which is built in gate circuit 3 of FIG. 1. The specific structure of interpolation pulse generator 3*a*, except for gate 88, is shown in FIG. 17. Pulse generator 3*a* receives a start signal As and a stop signal Bs, and a clock signal sc to output a start interpolation pulse SA and a stop interpolation pulse SB, as shown in FIG. 4, line (c) and line (d) and in FIG. 18, line (f) and line (k). The calibration pulse generator 5 has already been described in FIG. 1 and hence further discussion thereof is omitted hereat.

Switches 20*a*, 20*b* are switched so as to deliver start and stop pulses SA and SB and calibration pulse s5 to the next stage. The switching control of these switches 20*a*, 20*b* is performed by CPU 8. Switches 20*a*, 20*b* may comprise, for example, analog switches.

Time-to-voltage converters 6*a*,6*b* have the same structure as that already described in FIG. 1. In the following description, assumer for the purpose of illustration, that start interpolation pulse SA is applied via switch 20*a* to time-to-voltage converter 6*a* while stop interpolation pulse Sb is applied via a switch 20*b* to time-to-voltage converter 6*b*.

A to D converters 7*a*,7*b* have already been described in FIG. 1 and hence further description is omitted hereat Latches 9*a*,9*b* latch at high speeds the output values of A to D converters 7*a*,7*b* for temporary storage. The outputs from latches 9*a*,9*b* are inputted to CPU 8.

The embodiment just described comprises two sets of circuits, each comprising a time-to-voltage converter, an A to D converter and a latch. It measures start and stop interpolation pulses SA and SB by changing switches 20*a*,20*b*, so that even though these pulses SA and SB are produced close to each other, it is ensured that they are accurately measured. In addition the time-to-voltage converters and A to D converters are of the high speed type. Thus, the time interval between the two signals A1 and B1 can be accurately measured even though these signals are of high frequency.

The embodiment operates as follows. Signals A1, B1 to be measured and applied to input terminals p1, p2 are applied via input amplifiers 1*a*, 1*b* to comparators 2*a*, 2*b* which then shape the waveforms of the signals and input them to gate circuit 3. Gate circuit 3 generates a start interpolation pulse SA and a stop interpolation pulse SB, as shown in FIG. 18, line (f) and line (k). The measurement of the width ΔT1 of start interpolation pulse SA will be described below.

When start interpolation pulse SA is inputted, time-to-voltage convert 6*a* operates as follows. The converter 6*a* may be the structure depicted in FIG. 5, for example, wherein a buffer amplifier 21 receives interpolation pulse s3 or calibration pulse s5 and outputs two differential signals sq1, sq2. Amplifier 2 may comprise, for example, an ECL gate, a differential amplifier, etc. One output sq1 of amplifier 21 is inputted to the base of a transistor $Q_7$ and the other output sq2 is inputted to the base of transistor $Q_8$. The emitters of $Q_7$ and $Q_8$ are connected together to constant current source 22 which may comprise, for example, transistors and resistors. A constant current $i^o$ flows through constant current source 22 which is connected to a voltage −V. The collector of transistor $Q_7$ is connected to the circuit ground while the collector of transistor $Q_8$ is connected to amplifier 24.

A capacitor 23 is connected across the input to amplifier 24 and circuit ground. Capacitor 23 is also connected via a switch 28 to a voltage $V_o$. Switch 28 is controlled by a reset signal sr from outside the circuit of FIG. 5. The output from amplifier 24 is inputted to A to D converter 7*a* to be converted to a digital signal.

Figure 5:
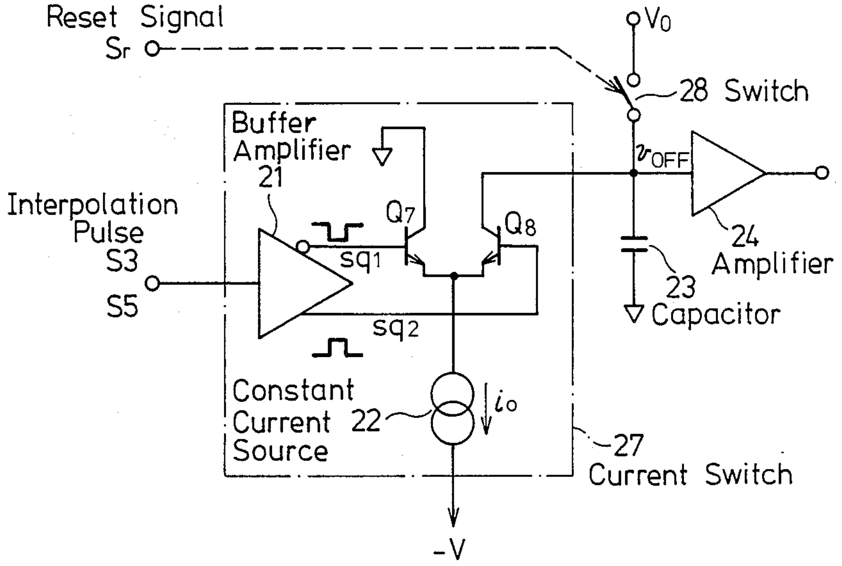
FIG. 5 depicts an illustrative time-to-voltage converter.
Figure 6:
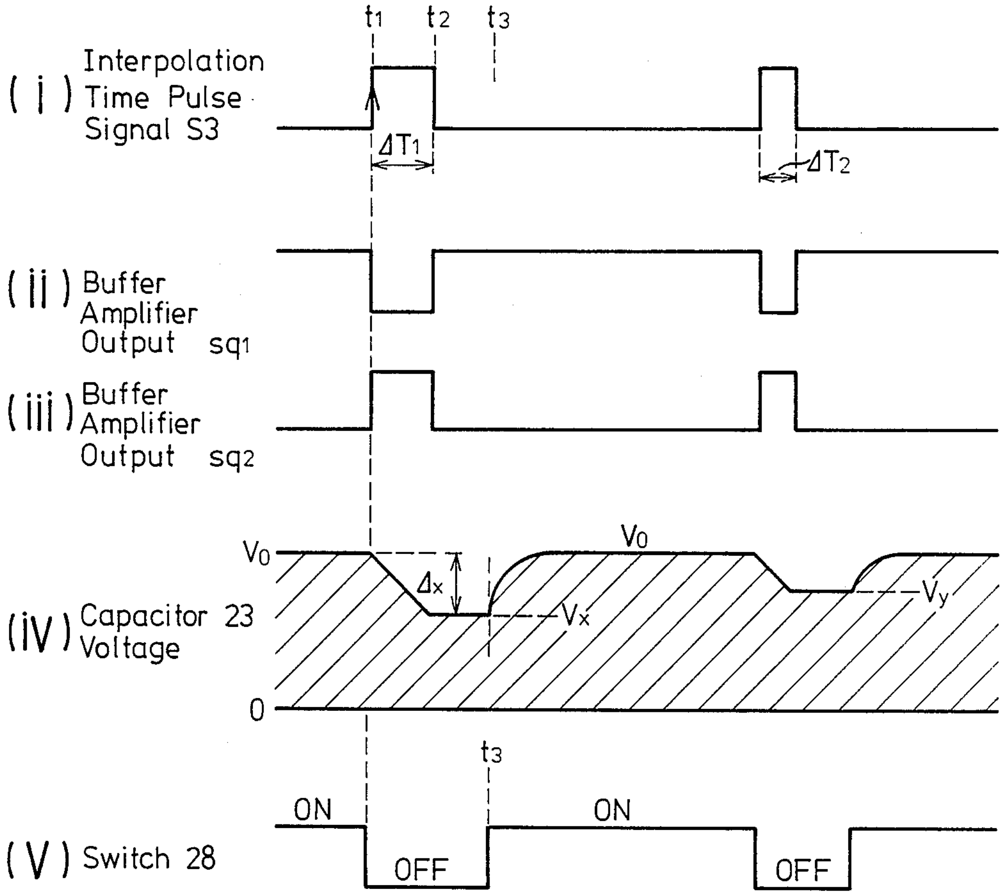
FIG. 6, comprising lines (i)–(v), is a timing chart for the circuit of FIG. 5.

FIG. 6, comprising lines (i)–(v), is a timing chart for the respective portions of FIG. 5. The operation of FIG. 5 will be described with reference to FIG. 6. Before interpolation pulse s3 or calibration pulse s5 is applied (i.e. before time $t_1$), signal sq1 of FIG. 6, line (ii) is "high" so that transistor $Q_7$ and $Q_8$ are ON and OFF, respectively. On the other hand, since switch 28 is ON before time $t_1$, as shown in FIG. 6, line (v), the voltage across capacitor 23 is Vo, as shown in FIG. 6, line (iv).

When, for example, interpolation pulse s3 of FIG. 6, line (i), is applied to buffer amplifier 21 at a time $t_1$, this amplifier outputs two pulse signals, sq1="low", and sq2="high", different in polarity, synchronously with the rising edge of pulse signal s3. At the same time, switch 28 is turned OFF by reset signal sr.

Therefore, transistor $Q_7$ is turned OFF and transistor $Q_8$ is turned ON. As a result, charges stored across capacitor 23 start to discharge via transistor $Q_8$ with a current $i_o$, so that the voltage across capacitor 23 decreases, as shown in FIG. 6, line (iv), and takes a value Vx at a time $t_2$.

When interpolation pulse s3 rises at time $t_2$, the output signals sq1 and sq2 of amplifier 21 are inverted in polarity , as shown in FIG. 6, lines (ii) and (iii), synchronously with the fall of pulse s3. Thus, transistor $Q_8$ is turned OFF, so that the discharge from capacitor 23 stops.

On the other hand, switch 28 is still OFF, as shown in FIG. 6, line (v), so that capacitor 23 maintains voltage Vx.

At time $t_3$, reset signal sr is applied to switch 28 to switch switch 28 ON (see FIG. 6, line (v)). Thus, capacitor 23 is again charged to its initial voltage value $V_o$, as shown in FIG. 6, line (iv) to be in preparation for reception of the next interpolation pulse s3 or calibration pulse s5.

Figure 3:
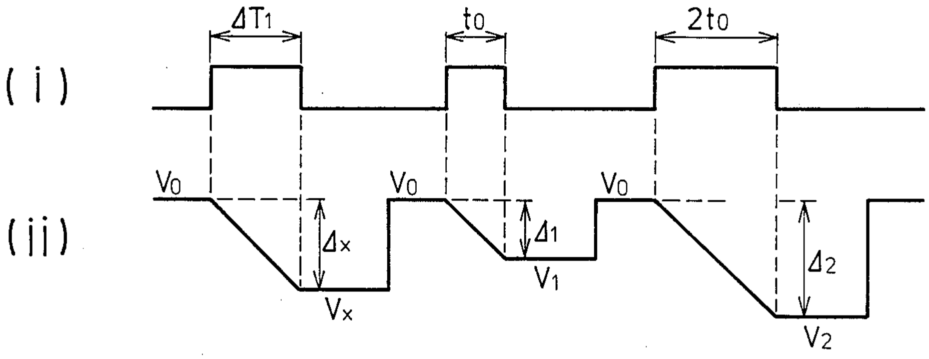
FIG. 3, comprising lines (i) and (ii), is a timing chart depicting operation of the invention.

By similar operation, voltages $V_1$, $V_2$ corresponding to the pulse widths $t_o$, $2t_o$ of calibration pulse s5, as shown in FIG. 3, are obtained. It is to be noted that in FIG. 6 calibration pulse s5 is not shown and only the stop interpolation pulse is shown.

The Vx, V1, V2 have the following relationships shown in Equations (2),(3),(4).

$$\begin{aligned} Vx &= V_o - \Delta x \\ &= V_o - \frac{1}{C}\int_o^{\Delta T1} (i_o - i_B)dt - v_{OFF} \\ &= -\frac{1}{C}(i_o - i_B)\Delta T1 + V_o - v_{OFF} \end{aligned} \quad (2)$$

Similarly, $$V1 = -\frac{1}{C}(i_o - i_B)\, t_o + V_o - v_{OFF} \quad (3)$$

$$V2 = -\frac{1}{C}(i_o - i_B) \cdot 2t_o + V_o - v_{OFF} \quad (4)$$

wherein, $i_o$ is the current value (integrated current value) of constant current source 22; C is the capacity of capacitor 23; $i_B$ is the bias current (currents, such as bias current in amplifer 24, or leakage current in capacitor 23, which may adversely influence the voltage across integrating capacitor 23 to cause an error, are generally referred to collectively as "bias current"); νOFF is the offset voltage in amplifier 24; $t_o$ is the period of the clock signal (having a known value); V1, V2 are voltages corresponding to the period of the clock signal (see FIG. 3).

CPU 8 performs the following operation to obtain the time interval Tx to be measured. First, the start interpolation time ΔT1 is obtained by Equation (5)

$$\frac{Vx - V1}{V2 - V1} = \frac{\Delta T1 - t_o}{2t_o - t_o} = \frac{\Delta T1 - t_o}{t_o} \quad (5)$$

$$\Delta T1 = \frac{Vx - V1}{V2 - V1} \cdot t_o + t_o$$

Similarly, the stop interpolation time ΔT2 is calculated by Equation (6)

$$\Delta T2 = \frac{VY - V1'}{V2' - V1'} \cdot t_o + t_o \quad (6)$$

wherein V1' and V2' denote the outputs from time-to-voltage converter **6*b* corresponding to the width of calibration pulse s5 in the measurement of stop interpolation pulse SB. That is, they correspond to voltages V1, V2 as shown in FIG. 3**, line (ii).

Thus, ΔT1, ΔT2 give the measured time interval Tx in the following Equation (7).

$$\begin{aligned} Tx &= Nt_o + \Delta T1 - \Delta T2 \\ &= N \cdot t_o + \frac{Vx - V1}{V2 - V1} \cdot t_o - \frac{Vy - V1'}{V2' - V1'} \cdot t_o. \end{aligned} \quad (7)$$

Thus, the influence due to bias current $i_B$, offset voltage νOFF, constant current $i_o$, capacitor's capacity C, and the charged voltage value $V_o$ across capacitor 23, is eliminated.

Figure 7:
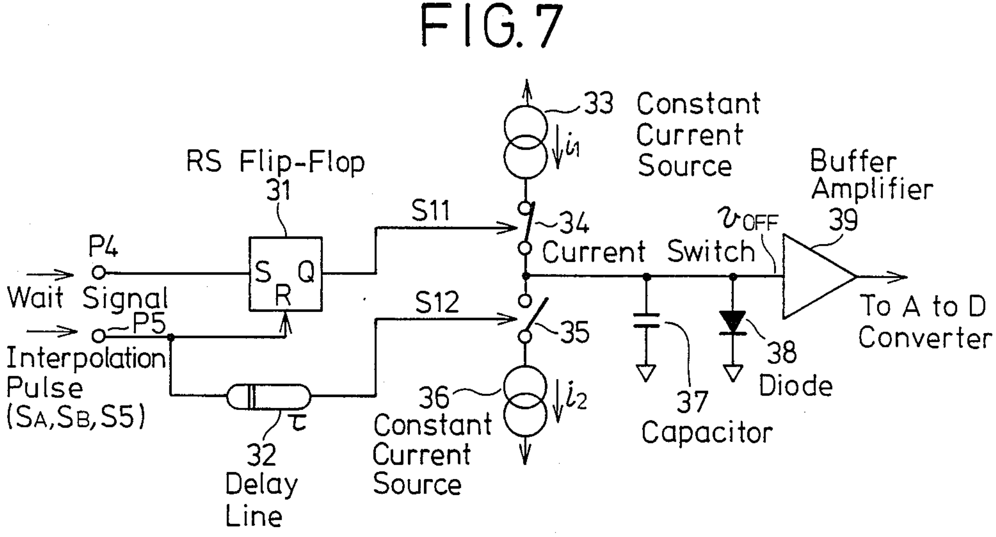
FIG. 7 depicts another illustrative time-to-voltage converter.

A time-to-voltage converter shown in FIG. 7 may be used instead of the converter shown in FIG. 5. The converter of FIG. 7 uses current switches to operate at higher speeds than the circuit of FIG. 5. It has a simpler structure than the FIG. 5 embodiment. The FIG. 5 circuit uses a voltage switch 28 as a means for applying a constant voltage $V_o$ to capacitor 23. A voltage switch and a current switch generally have the following differences:

1. The current switch can be implemented so as to have a simpler structure than the voltage switch. That is, the current switch can simply comprise, for example, two transistors while the voltage switch comprises, for example, MOS FET (metal oxide semiconductor field effect transistor)etc, so that its structure is more complex.

2. The current switch is switched at higher speeds than the voltage switch. The reason for this is that in order for the MOS FET to be completely turned ON in the case of the voltage switch, a high voltage signal must be applied to the gate terminal by switching. However, it is difficult to switch the high voltage signal at high speeds. On the other hand, the current switch has no such problems.

In FIG. 7, an input terminal p4 receives a wait signal from CPU 8. An input terminal p5 receives start and stop interpolation pulses SA, SB and calibration pulse s5. An RS flip-flop 21 (referred to as FF31) receives a wait signal at its S terminal and interpolation pulses SA, SB and calibration pulse s5 at its R terminal. The output s11 of Q terminal is used as a signal to control a current switch to be described later in more detail.

A delay line 32 delays interpolation pulses SA, SB and calibration pulse s5 inputted thereto by a time t. The output s12 from delay line 32 is used as a signal s12 to control a current switch to be described in more detail below. A commercially available delay line may be used as delay line 32. Alternatively, signal s12 may be delayed if a conductor along which signal s12 of FIG. 7 is transmitted, is extended instead of providing delay line 32. In other words, arrangement may be such that the existing circuit equivalently serves the same function as delay line 32 without especially providing delay line 32.

Constant current sources 33, 36 provide constant currents i1 and i2, in the directions, respectively, shown in FIG. 7. These sources 33 and 36 may comprise, for example, transistors and high resistors.

Figure 9:
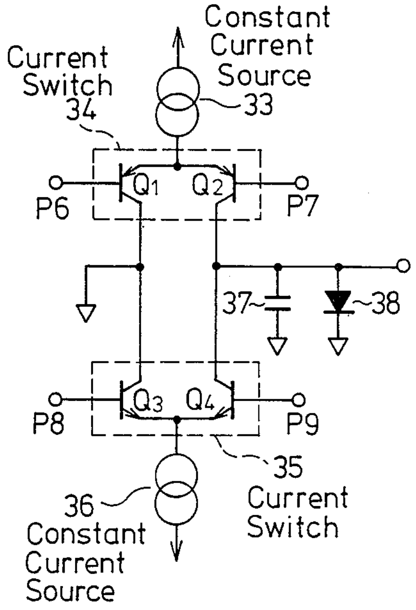
FIG. 9 depicts an illustrative current switch , such as used in FIG. 7, and labelled 34 and 35.

Current switches 34,35 may comprise, for example, transistors, as shown in FIG. 9. Current switch 34 is ON-OFF controlled by output signal sll from FF31 while current switch 35 is ON-OFF controlled by output signal s12 from delay line 32. Constant current source 33, current switches 34,35, and constant current source 36 are connected in series, as shown in FIG. 7.

An integrating capacitor 37 is connected across the junction of current switches 34, 35 and the circuit ground. The terminal voltage across capacitor 37 changes in accordance with the pulse width of interpolation pulses SA, SB and calibration pulse s5.

A clamping diode 38 is connected in parallel to capacitor 37. A buffer amplifier 39 comprises a high input resistance amplifier which amplifies the voltage across capacitor 37 and performs impedance conversion for the next stage. It is to be noted that the high input resistance amplifier may comprise, for example, a non-inverting operational amplifier.

Figure 8:
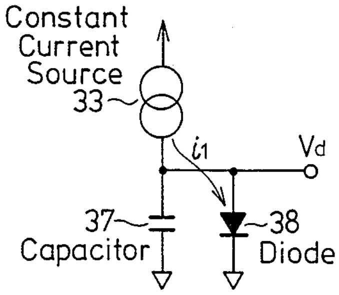
FIG. 8 illustrates the operation of the circuit of FIG. 7.
Figure 10:
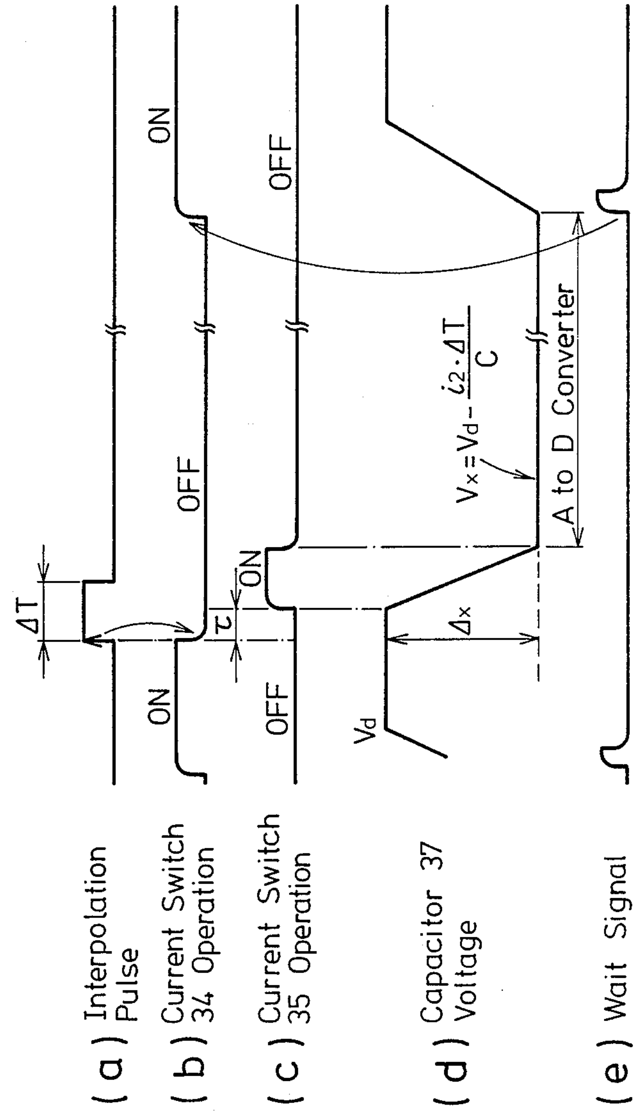
FIG. 10, comprising lines (a)–(e), is a timing chart for the circuit of FIG. 7.

FIG. 8 is a diagram for explaining the operation of the peripheral circuits for current switches 34, 35 and capacitor 37 FIG. 9 shows the specific structures of current switches 34,35. FIG. 10 is a timing chart for the FIG. 7 device.

The operation of the apparatus of FIG. 7 is as follows.

1. After a wait signal (see FIG. 10, line (e)) is inputted to terminal p4, FF31 is set, current switch 34 is ON and current switch 35 is OFF (see FIG. 10, line (b) and line (c)). Thus, current i1 from constant current source 33 charges capacitor 37. When the potential at capacitor 37 reaches the forward voltage Vd of diode 38, a current flows through diode 38, as shown in FIG. 8 so that the voltage across capacitor 37 is maintained at the forward voltage Vd of diode 38 (see FIG. 10, line (d)).

2. When, for example, interpolation pulse s3 (SA, SB) is applied to terminal p5, it is applied to the R terminal of FF31, so that FF31 is immediately reset and the rising edge of pulse s3 turns OFF current switch 34 (see FIG. 10, line (b)). On the other hand, since interpolation pulse s3 is delayed by delay line 32, current switch 35 is turned ON delayed by time $\tau$ from the rising edge of pulse s3 (see FIG. 10, line (c)). The time $\tau$ ensures a time after which current switch 34 is surely turned OFF. Generally, switch means using a semiconductor is not immediately turned OFF, but turned OFF gradually with a dull waveform, such as shown in FIG. 10, line (b).

If current switch 35 is turned ON when current switch 34 is still ON, equation (8) to be described below does not hold, so that it is impossible to convert a time to a voltage accurately. Thus, delay time $\tau$ is needed.

3. When current switch 35 is turned ON (see FIG. 10, line (c)) after current switch 34 is turned OFF, capacitor 37 is charged or discharged via current switch 35 with constant current i2. This charging or discharging operation continues during the ON time of current switch 35, namely, duration of interpolation pulse s3 or calibration pulse s5, so that the voltage Vx across capacitor 37 after, for example, interpolation time ΔT is given by Equation (8).

$$Vx = Vd - \frac{1}{C} \int_{o}^{\Delta T} i2 \cdot dt = Vd - \frac{i2 \cdot \Delta T}{C} \quad (8)$$

wherein Vd is the forward voltage across diode 38; C is the capacity of capacitor 37. Thus, as can be appreciated, the voltage across capacitor 37 depends on the pulse width ΔT of the interpolation pulse.

In Equation (8), the offset voltage $\nu$OFF of buffer amplifier 39 and bias current iB which includes the superposition of error current such as the leakage current flowing from capacitor 37, and the current flowing from buffer amplifier 39, and the leakage current flowing from switch 35, are neglected. Considering the offset voltage $\nu$OFF and the bias current iB, rewriting Equation (8) yields the following.

$$Vx = Vd - \frac{1}{C} \int_{o}^{\Delta T} (i2 - iB)dt - \nu_{OFF} \quad (9)$$

Equation (9) differs from Equation (2) only in that $V_o$ and $i_o$ in Equation (2) are changed to Vd and i2, respectively. Thus, Equation (9) is substantially identical to Equation (2).

Similarly, voltages V1 (the same as Equation (3)), V2 (the same as Equation (4)) corresponding to calibration pulse widths $t_o$, $2t_o$, respectively, are obtained from the circuit of FIG. 7, so that the measured time interval Tx can be measured by performing the operations of Equations (5)-(7) using CPU 8.

If current switches 34,35 have the structures shown in FIG. 9 they can perform high speed switching operations. In FIG. 9, current switch 34 comprises differential transistors Q1 and Q2 and current switch 35 comprises differential transistors Q3 and Q4. The Q output of FF 31 is applied to terminal p6 and $\overline{Q}$ output of FF31 is applied to terminal p7. On the other hand, signal s12 is applied to terminal p9 and signal $\overline{S12}$ applied to terminal p8. It is to be noted that signal $\overline{S12}$ is not shown in FIG. 7, and a pulse signal includes an inverse of signal s12. It can be easily produced by an inverter. It is known that a differential transistor circuit can generally perform a high speed switching operation.

4. Current switch 35 is turned OFF after the pulse width ΔT of the interpolation pllse. On the other hand, current switch 34 is turned OFF, so that the voltage across capacitor 37 is unchanged. This voltage is inputted to high input resistance buffer amplifier 39 whose output is read by A to D converter 7 of FIG. 1. Then, a wait signal sets FF 31, turns ON current switch 34, and turns OFF current switch 35 into its initial state to thereby prepare for the next measurement. That is, diode 38 is turned ON, so that the voltage across capacitor 37 becomes equal to the forward voltage Vd of the diode.

Figure 11:
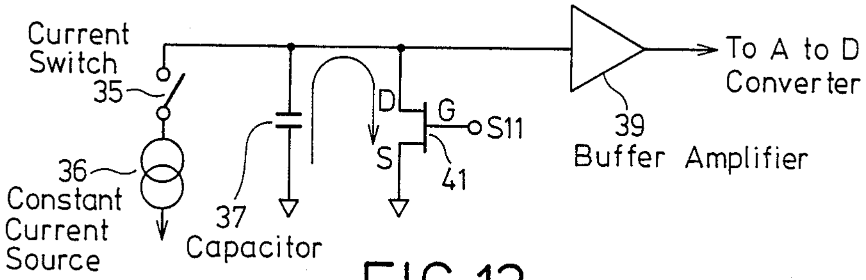
FIG. 11, depicts a further illustrative time-to-voltage converter.

FIG. 11 shows a modification of the FIG. 7 device. It is to be noted that signal s12 which drives current switch 35 of FIG. 11 and signal s11 which is applied to the gate of FET 41 of FIG. 11, are the same signals as s11, s12 of FIG. 7. FIG. 11 omits description of FF31 and delay line 32 of FIG. 7. FIG. 11 is different from FIG. 7 in that a voltage switch comprising FET 41 is provided instead of diode 38 and current switch 34. FET 41 is intended to discharge the electric charges stored in capacitor 37. In this case, the potential of capacitor 37 becomes equal to the potential of source s of FET 41, so that diode 38 of FIG. 7 becomes unnecessary.

Figure 12:
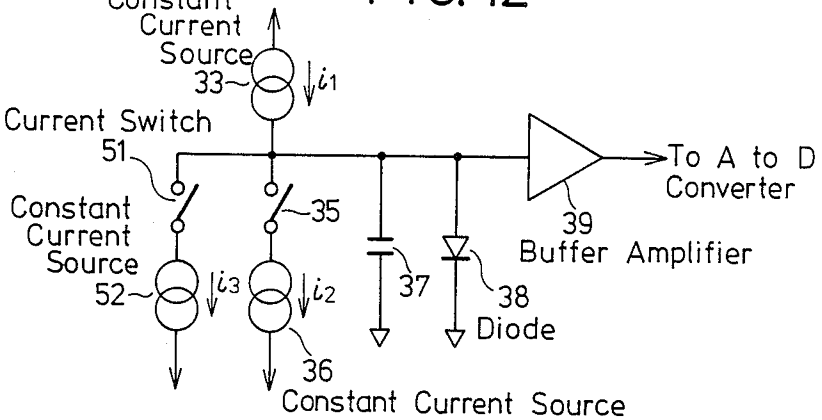
FIG. 12, depicts a still further illustrative time-to-voltage converter.
Figure 13:
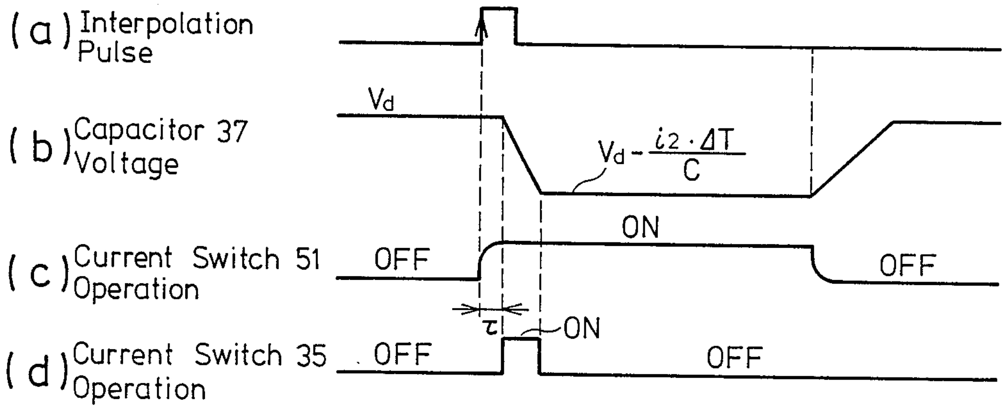
FIG. 13, comprising lines (a)-(d), is a timing chart for the circuit of FIG. 12.

FIG. 12 shows another modification of FIG. 7. The structure of FF 31, etc, which drive current switches 35, 51 is the same as the FIG. 7 device, so that its description is omitted hereat. FIG. 13, comprising lines (a)-(d), is a timing chart for the device of FIG. 12. FIG. 12 is different from FIG. 7 in that (1) Constant current source 33 always supplies current i1. Thus, current switch 34 of FIG. 7 is removed and the conductors wich were connected to current switch 34 are connected permanently to each other. (2) A constant current source 52 having a current value i3 equal to that of i1 of constant current source 33 and a current switch 51 are newly provided.

The operation of FIG. 12 is as follows. Before an interpolation pulse is applied, current switches 35, 51 are OFF (see FIG. 13, line (c) and line (d)). The voltage across capacitor 37 is caused to be Vd by the action of constant current source 33.

When an interpolation pulse rises, current switch 51 is turned ON synchronously with the rising edge of the interpolation pulse. In this case, the currents i1 and i3 of the constant current sources 33,52 are equal, so that current i1 which flows toward diode 38 is cancelled.

Under such a condition, current switch 35 is turned ON delayed by time $\tau$ from the rising edge of the interpolation pulse. Thus, capacitor 37 is discharged or charged with current i2, so that the voltage across capacitor 37 changes, as shown in FIG. 13(*b*). This operation is the same as that described with reference to FIG. 10.

Although current switch 35 is turned OFF after the interpolation time, current switch 51 is still maintained ON so that the voltage across capacitor 37 is held unchanged.

The subsequent operations are the same as those described with reference to FIGS. 7 and 10, so that they will not be described hereat.

When the time-to-voltage converter is constituted as shown in FIG. 12, current switches 35, 51 may be constructed by npn transistors, so that the converter can operate at higher speeds and are also easier to implement with ICs.

It is to be noted that the operation of current switch 51 of FIG. 13 is in reverse relationship to the ON-OFF operation of current switch 34 of FIG. 7 (see FIG. 10, line (b) and FIG. 13, line (c)). Thus, a signal can be taken, for example, as signal s11 shown in FIG. 7, for the $\overline{Q}$ terminal of FF 31 to control current switch 51.

Figure 19:
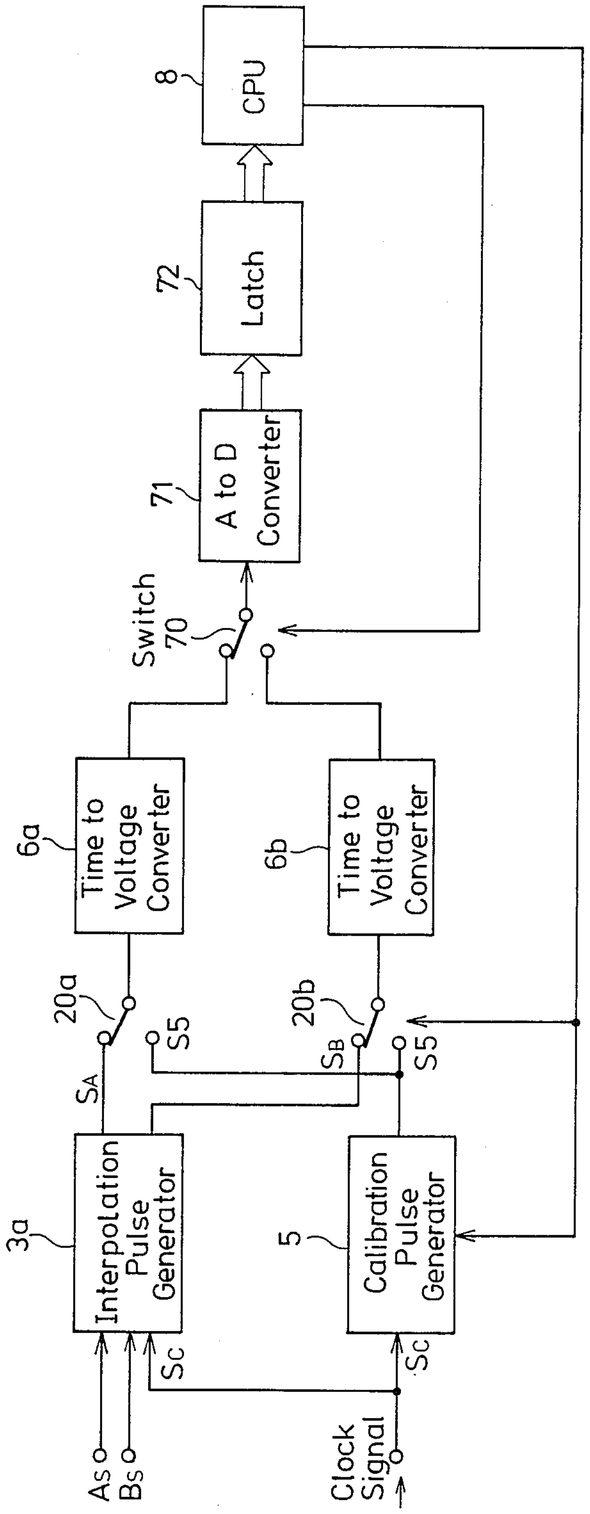
FIG. 19 is a block diagram depicting a further illustrative embodiment of the invention.
Figure 20:
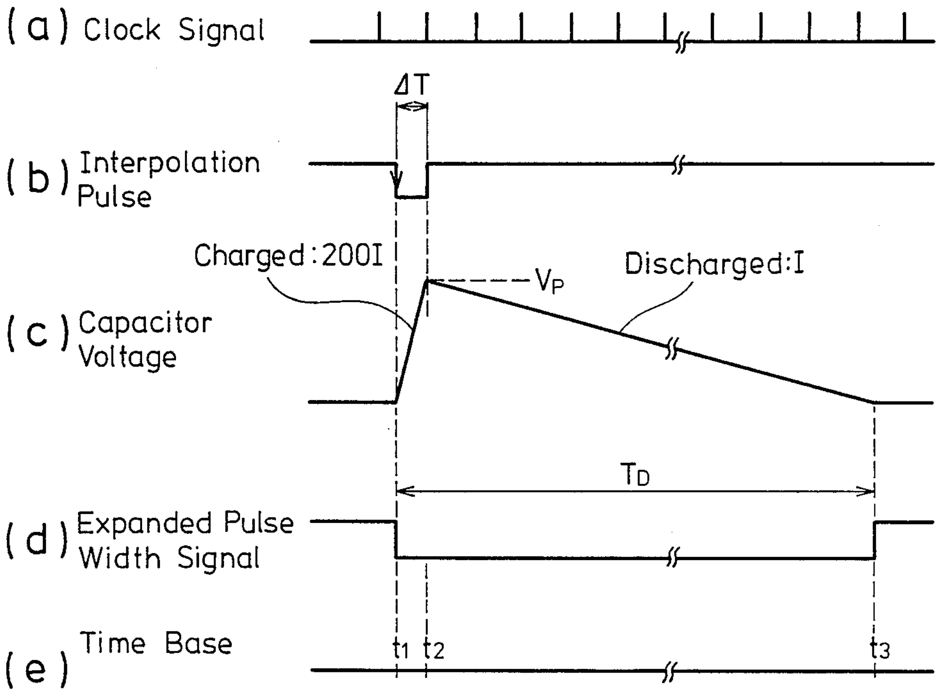
FIG. 20, comprising lines (a)-(e), is a timing chart for explaining a conventional apparatus.

It is noted that while in the above, two sets have been described, each consisting of an A to D converter and a latch, the. invention can operate using one set of an A to D converter and a latch. FIG. 19 shows the structure in this case.

FIG. 19 is different from FIG. 2 in that a switch 70 is added before A to D convert 71 to switch the outputs of two time-to-voltage converters 6*a*, 6*b* to A to D converter 71. The response of A to D convert 71 is usually sufficiently fast, and the output value from the time-to-voltage converter is held by capacitor 37, so that start and stop interpolation pulses SA and SB can be converted to the corresponding digital signals even though they may occur close to each other. The digital siganls are stored in latch 72, then read and subjected to predetermined operations by CPU 8 to obtain the measured time interval Tx.

This time measuring apparatus is constructed such that the sequence in which the start and stop interpolation pulse SA and SB are measured is predetermined so that the time interval from the start interpolation pulse SA to the stop interpolation pulse SB is measured at all times.

Figure 14:
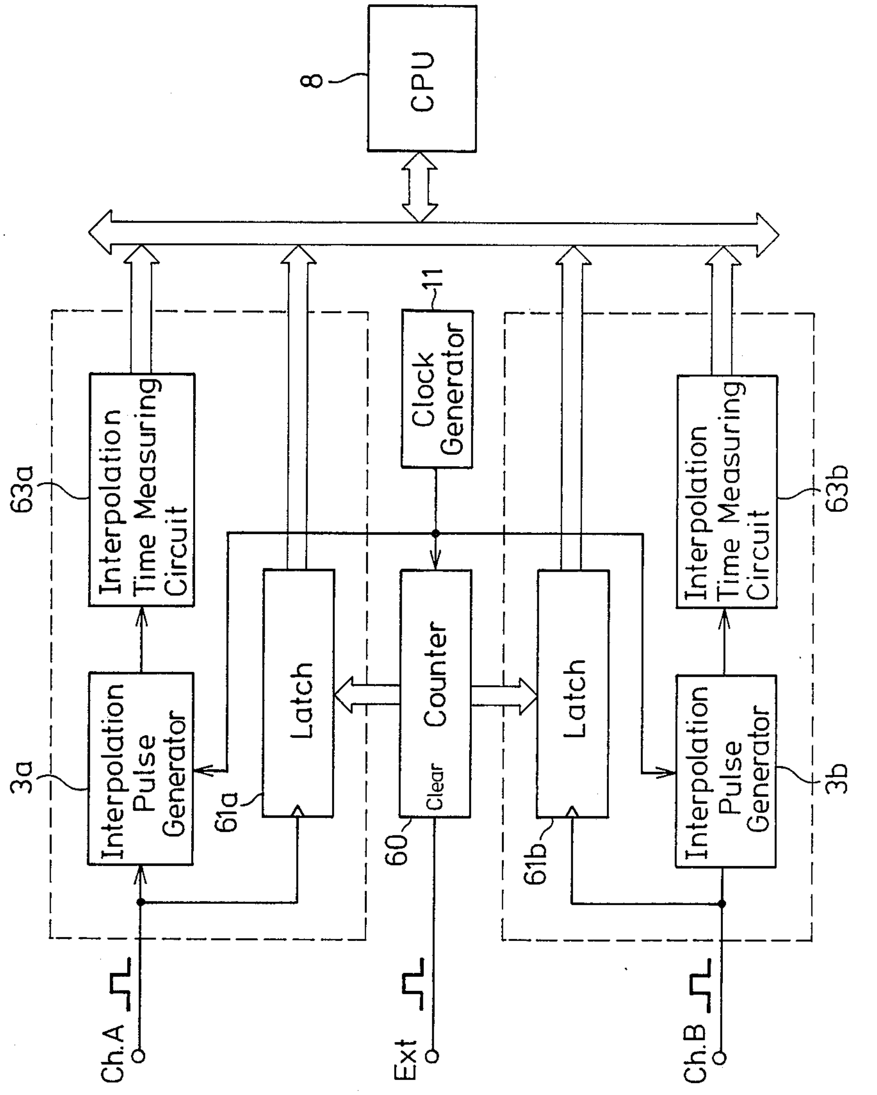
FIG. 14 is a block diagram depicting another illustrative embodiment of the invention.
Figures 15A, 15B:
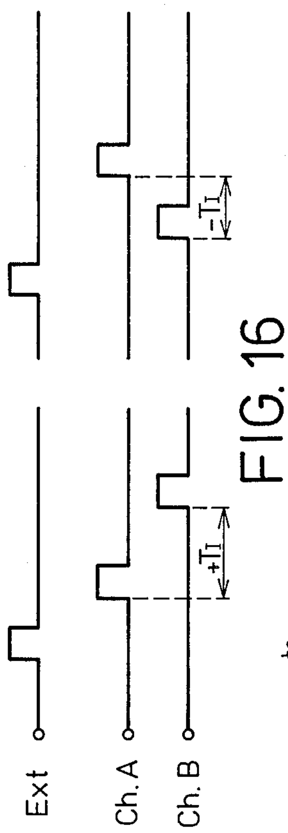
FIGS. 15A and 15B are timing charts for the circuit of FIG. 14.
Figure 16:
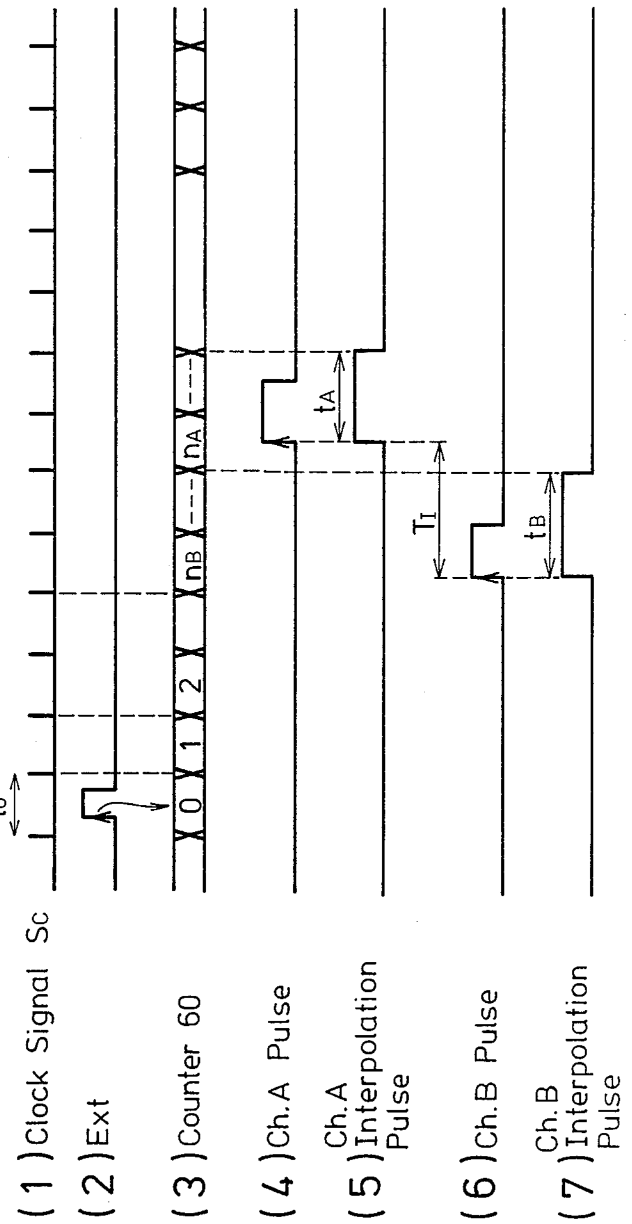
FIG. 16, comprising lines (1)-(7), is a timing chart for the circuit of FIG. 14.

FIG. 14 illustrates a time measuring apparatus which is capable of measuring the time difference between two input signals by using the circuits shown in FIGS. 1,2 and 7, in spite of the sequence of the times at which the two signals occur. FIGS. 15A and 15B illustrate the relationship between the sequences of two signals which can be measured by the device of FIG. 14. FIG. 16, comprising lines (1)-(7), is a timing chart for signals at respective sections of the FIG. 14 apparatus.

First, the relationship between the sequences of the times at which two signals occur, and which can be measured by the device of FIG. 14 will be described using FIG. 15. FIG. 15A shows that the signal inputted to a channel A occurs earlier than the signal inputted to a channel B. The device of FIG. 14 can measure this time different +T1. FIG. 15B shows the case which is reverse to that of FIG. 15A, namely, the signal inputted to channel B occurs earlier than the signal inputted to channel A. The apparatus of FIG. 14 is also capable of measuring the time difference −T1.

In FIG. 14, a counter 60 counts clock pulses sc. When an Ext signal is applied to counter 60, counter 60 is cleared and starts to count newly from that time. The output from counter 60 is inputted to a latch to be describe hereinbelow Latches 61*a*,61*b* latch the content of counter 60 when two pulse signals, the time interval between which is to be measured, are inputted to channels A and B, respectively (the pulse signals are hereinafter referred to as the signal ch. A and the signal ch.B).

Interpolation pulse generators 3*a*,3*b* generate interpolation pulses from a clock signal, signals ch.A and ch.B. The generators are the same as those described with reference to FIG. 2. Interpolation time measuring circuits 63*a*, 63*b* output digital signals corresponding to the widths tA,tB of the input interpolation pulses. The circuits 63*a*, 63*b* may be implemented by providing an A to D converter at the output of the circuit of FIG. 7.

CPU 8 performs arithmetic operations to obtain the measured time interval and is the same as that described in FIGS. 1 and 2. A clock generator 11 outputs a stable clock signal and is the same as that shown in FIG. 1.

The operation of the FIG. 14 embodiment is described with reference to FIGS. 15 and 16. The FIG. 14 apparatus measures the time interval from a time when a signal is inputted to Ext to a time when signals ch.A and signal ch.B are inputted and obtains the difference between them to thereby measure the time interval. Thus, measurement is possible even though the signal ch.B occurs earlier than signal ch.A (i.e. −T1). It is possible to measure the time interval with high resolution by measuring the interpolation pulses. It is to be noted that the operations to measure the signals ch.A and ch.B inputted to channels A and B, are substantially the same. Thus, operation for channel A alone will now be described.

Counter 60 counts clock pulses sc (see FIG. 16, line (1)). When Ext (see FIG. 16, line (2)) is inputted, counter 60 is cleared and starts to count new again (see FIG. 16, line (3)). It is to be noted that the clearing operation is not necessarily needed.

When signal ch.A is inputted to channel A (see FIG. 16, line (4)), the value nA of counter 60 at the time is latched. Simultaneously, interpolation pulse tA is produced (see FIG. 16, line (5)), the pulse width tA of which is then measured by interpolation time measuring circuit 63*a*.

The circuit of FIG. 7 is used as the interpolation time measruing circuit, so that the voltage Vc across capacitor 37 (see FIG. 7) after a lapse of interpolation time tA is given by Equation (10) which is the same as Equation (8).

$$Vc = Vd - \frac{1}{C}\int_{o}^{\Delta T} i2 \cdot dt = Vd - \frac{i2 \cdot \Delta T}{C} \quad (10)$$

wherein Vd is the forward voltage across diode 38 and C is the capacity of capacitor 37. The value of interpolation time tA can be known as described with reference to Equation (5). The value of interpolation time t3 can also be known using the interpolation pulse generator 3*d* and interpolation time measuring circuit 63*b*.

CPU 8 performs the following operations to obtain the time interval $T_1$ shown in FIG. 16.

$$T1 = (nA\,t_o - tA) - (nBt_o - tB) = (nA - nB)\cdot t_o - tA + tB \quad (11)$$

Equation (11) can be understood as using the same concept as Equation (1). That is to say, $(nA-nB)\cdot t_o$ of Equation (11) corresponds to $Nt_o$ of Equation (1), tA of Equation (11) corresponds to ΔT1 of Equation (1) and tB of Equation (11) corresponds to ΔT2 of Equation (1). The reason why the signs of tA and tB of Equation (11) differ from those of Equation (1) will be understood from consideration of FIGS. 4 and 16. Namely, FIG. 16 is different from FIG. 4 in that ch.A pulse (interpolation time tA) occurs later than ch.B pulse (interpolation time tB).

What is claimed is:

1. A time measuring apparatus for converting the pulse width of an interpolation pulse to a voltage, converting said voltage to a digital signal, inputting said digital signal to a central processing unit (8), and performing an arithmetic operation on said digital signal at said central processing unit, to measure a time interval (Tx), said apparatus comprising a pair of time-to-voltage converters, each comprising an integrating capacitor (37), a clamping (38) connected in parallel with said capacitor (37), a constant current source (33) for supplying a first flow of current (il) in advance to said parallel circuit comprising said capacitor (37) and said diode (38) via a first current switch (34) which is turned OFF synchronously with occurrence of an interpolation pulse, to apply an initial voltage value (Vd), a second current switch (35) for supplying a second flow of constant current (i2) to said capacitor(37) for the duration of a pulse width of said interpolation pule after said first current switch (34) is turned OFF, and wherein one of said time-to-voltage converters converts a pulse width of a start interpolation pulse to a corresponding voltage, and the other of said time-to-voltage converters converts a pulse width of a stop interpolation pulse to a corresponding voltage.

2. A time measuring apparatus for converting the pulse width of an interpolation pulse to a voltage, converting said voltage to a digital signal, inputting said digital signal to a central processing unit, and performing an arithmetic operation on said digital signal at said central processing unit, to measure a time interval, said apparatus comprising a pair of time-to-voltage converters, each comprising an integrating capacitor, a clamping diode connected in parallel with said capacitor, a first constant current source for supplying a flow of current to said parallel circuit of said capacitor and said diode to apply an initial voltage value to said capacitor, a second constant current source for applying a current so as to cancel said flow of current supplied to said parallel circuit via a first current switch which is turned ON synchronously with the occurrence of an interpolation pulse, and a second current switch for supplying a constant current to said capacitor during a pulse width of an interpolation pulse after said first current switch is turned ON.

* * * * *